United States Patent
Okabe et al.

(10) Patent No.: US 8,405,497 B2
(45) Date of Patent: Mar. 26, 2013

(54) ALARM DEVICE FOR CLUTCH

(75) Inventors: Kazunari Okabe, Sagamihara (JP); Akihiko Fujimoto, Sagamihara (JP); Takeshi Harasawa, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 333 days.

(21) Appl. No.: 12/598,154

(22) PCT Filed: Oct. 22, 2008

(86) PCT No.: PCT/JP2008/069579
§ 371 (c)(1),
(2), (4) Date: Nov. 30, 2009

(87) PCT Pub. No.: WO2009/057610
PCT Pub. Date: May 7, 2009

(65) Prior Publication Data
US 2010/0200357 A1 Aug. 12, 2010

(30) Foreign Application Priority Data

Oct. 30, 2007 (JP) ................................. 2007-282481

(51) Int. Cl.
*B60W 10/00* (2006.01)
(52) U.S. Cl. ............ 340/454; 340/453; 477/76; 477/77; 477/906; 192/30 W; 73/115.04; 701/67
(58) Field of Classification Search .................. 340/453, 340/454; 477/76–78, 97–98, 906; 192/30 W; 73/115.04; 701/67
See application file for complete search history.

(56) References Cited

U.S. PATENT DOCUMENTS

| 5,723,779 A | 3/1998 | Hara et al. |
| 2004/0061603 A1 * | 4/2004 | Mack ............................. 340/453 |
| 2004/0214686 A1 * | 10/2004 | Katou ............................. 477/98 |
| 2005/0211524 A1 * | 9/2005 | DeVore et al. ............... 192/3.63 |

FOREIGN PATENT DOCUMENTS

| DE | 35 40 719 A1 | 6/1986 |
| DE | 41 24 722 A1 | 1/1993 |
| DE | 10 2005 029 566 A1 | 2/2006 |
| JP | 5-164149 A | 6/1993 |
| JP | 3348590 B2 | 11/2002 |
| JP | 2008-57670 A | 3/2008 |
| WO | WO 03/087614 A1 | 10/2003 |

OTHER PUBLICATIONS

Supplementary European Search Report dated Oct. 28, 2011.

* cited by examiner

*Primary Examiner* — Jennifer Mehmood
*Assistant Examiner* — Andrew Bee
(74) *Attorney, Agent, or Firm* — Birch, Stewart, Kolasch & Birch, LLP (57) ABSTRACT

An alarm device for a clutch that issues an alarm indicating a lifetime expiration of the clutch that selectively connects and disconnects an input shaft to and from an output shaft, includes: a slip heat release threshold setting unit 104 that establishes a threshold criteria as to a clutch damage or the clutch lifetime, in a form of a relation between a heat release generated in a clutch slip operation and a frequency of the heat release occurrences; and a slip heat release calculator 105 that calculates the heat release during the clutch operation, based on a hydraulic oil pressure in an actual clutch operation and a relative circumferential speed between input and output shafts, the alarm device 11 issues the alarm based on the calculation result through the slip heat release calculating means 105 and the slip heat release threshold setting means 104.

5 Claims, 4 Drawing Sheets

|   | Level | Count | Count /hr | Typical Q | Allowable limit number from Q - N curve |
|---|---|---|---|---|---|
| 1 | $Q_{S1} \sim Q_{S2}$ | n1 | nh1 | $Q_{S2}$ | N1 |
| 2 | $Q_{S2} \sim Q_{S3}$ | n2 | nh2 | $Q_{S3}$ | N2 |
| 3 | $Q_{S4} \sim Q_{S5}$ | n3 | nh3 | $Q_{S5}$ | N3 |
| ⋮ |  | ⋮ | ⋮ | ⋮ | ⋮ |
| i | $Q_{Sn-1} \sim Q_{Sn}$ | ni | nhi | $Q_{Sn}$ | Ni |

ALARM DEVICE FOR CLUTCH

BACKGROUND OF THE INVENTION

1. Field of the Invention

This application relates to an alarm device for a wet clutch in which an input shaft is connected to or disconnected from an output shaft by charging or discharging hydraulic oil (fluid) pressure into or out of an oil pressure chamber in the clutch (a clutch oil chamber), whereby the alarm device raises an alarm as to the duration of life (a lifetime prediction alarm) of the clutch.

2. Background of the Invention

The patent reference 1 (JP1993-164149) discloses a method for determining criteria as to the duration of life (a use limit regarding operating time) of a wet clutch, the clutch being provided between an engine and a driven machine such as a forklift, and a clutch disk of the clutch being connected to or disconnected from a counter clutch disc of the clutch so that an input shaft is connected to or disconnected from an output shaft by charging or discharging hydraulic oil (fluid) pressure working on the surfaces of the clutch discs.

In the technology of the patent reference 1, the main control unit for the clutch is provided with:

a clutch control means to control the clutch via an actuator;

an input rotation speed detecting means to detect rotation speed for the input shaft of the clutch;

an output rotation speed detecting means to detect rotation speed for the output shaft of the clutch;

an actuator position detecting means to detect the position of the actuator where the actuator is shifted by a supposed displacement from the actuator final position where the actuator is set free; and a clutch wear estimating means for judging the clutch to be worn, through an arithmetic operation as to the slip of the clutch based on the input rotation speed and the output rotation speed, when the result of the arithmetic operation as to the slip reaches a predetermined value;

wherein, the clutch wear judgment is performed by use of the result of the arithmetic operation as to the slip, when the position of the actuator reaches to the predetermined a position predetermined by the actuator position detecting means.

The patent reference 2 (JP3348590) discloses a remaining lifetime estimating device for a wet clutch, whereby a clutch disc temperature Tp is calculated based on a revolution speed difference ΔN, a control oil pressure Pc, a clutch oil temperature T0, and a duration of time t where the revolution speed difference ΔN is generated; the calculated temperature Tp is classified into a plurality of predetermined temperature intervals; the cumulative duration of time is measured for each of the predetermined temperature intervals, whereby a calculated temperature is within a corresponding interval; by applying Miner's law to a clutch disc endurance curve (a characteristic curve as to the disc lifetime expectancy in relation to the disc temperature), the remaining lifetime of the clutch, namely, the roadworthy remaining hours are calculated and displayed in a display. Thus, the patent reference 2 regards a failure of the clutch as foreseeable.

In general, Miner's law is a law by which a cumulative damage of a material is estimated according to the S-N characteristic curve (a fatigue endurance limit characteristic curve) of the material; whereby, S denotes the stress (a force per unit area) that works on or in the material, and N denotes the allowable maximum repetition numbers at the stress S; further, in the law of Miner, the material is regarded as damaged (fatigue-fractured) when the following equation holds:

$$\sum_{i=1}^{m} \frac{n_i}{N_i} = 1$$

where $N_i$ is the allowable maximum repetition numbers at the stress $S=S_i$, and the stresses $S_1, \ldots, S_m$ are repeated $n_1$ times, ..., $n_m$ times, respectively. In actually considering the S-N curve, the S-N curve may be regarded as a histogram (a bar chart) in which the vertical axis corresponds to the stress S and the divided intervals thereof, while the lateral axis corresponds to the numbers N of allowable repetition of the stress; thereby, a plurality of bars of the histogram is placed in parallel to the lateral axis, each of the bars corresponding to a stress interval on the vertical axis.

In the applied Miner's law of the above reference 2, a Tp-t characteristic curve (a curve as to the clutch disc temperature in relation to the cumulative time duration) instead of the S-N characteristic curve is employed so as to obtain a cumulative damage law.

As described later, in this invention, a Q-N characteristic curve instead of the S-N curve is used so as to estimate the clutch use limit by use of a Miner's law, whereby Q is related to heat release (amount) in the clutch, and N relates to an allowable maximum repetition numbers as to the clutch slip operation when the slip operation is repeated at an heat release increment (interval) to which a Q level belongs; namely, a Q-N bar chart is taken into account as is the case of the above described S-N bar chart.

In a conventional wet clutch, the clutch being provided between an engine and a driven machine such as a forklift, and a clutch disc of the clutch being connected to or disconnected from a counter clutch disc of the clutch so that an input shaft is connected to or disconnected from an output shaft by charging or discharging hydraulic oil pressure working on the surfaces of the clutch discs, a criteria (an allowable use limit of a clutch) determining means treats with a plurality of factors to determine the lifetime of the clutch such as the frequency (and mode) of use as to the clutch, the energy level at which the clutch absorbs generated friction energy, and the surface temperature of the clutch disc; and, the clutch is controlled so that the level of each of the factors does not conflict with a corresponding allowable limit (a criteria).

In the technology of the patent reference 1, the clutch wear estimating means is provided so as to judge whether or not the clutch has worn, through the arithmetic operation result as to the slip of the clutch based on the input rotation speed and the output rotation speed; hereby, the arithmetic operation result as to the slip corresponds to the determining factor as to the clutch lifetime; the wear judgment is performed by detecting the slip, when the position of the actuator reaches to the predetermined a position predetermined by the actuator position detecting means.

In other words, the technology of the patent reference 1 uses the slip factor as to the clutch in determining the clutch lifetime; however, as described above, in determining the criteria as to the lifetime of the clutch (an allowable use limit of a clutch), there are several factors such as the frequency (and mode) of use as to the clutch, the energy level at which the clutch absorbs generated friction energy, and the surface temperature of the clutch disc; but not only the reference 1 dose not disclose how these factors effect on the lifetime of the clutch, but also the reference 1 dose not show any means by which an alarm is raised prior to the lifetime expiration, as well as that failure protection measures are adopted.

Further, as described above, in the patent reference 2, the clutch disc temperature Tp is calculated; the calculated temperature is classified into a plurality of predetermined temperature-intervals; the cumulative duration of time is measured per each of the predetermined temperature-intervals, whereby the calculated temperature is within the corresponding interval; by applying Miner's law to a clutch disc endurance curve (a characteristic curve as to the disc lifetime expectancy in relation to the disc temperature), the remaining lifetime of the clutch, namely, the roadworthy remaining hours are calculated and displayed in a display. Thus, the reference 2 regards a failure (damage) of the clutch as foreseeable. However, the reference 2 does not show how to establish the criteria as to the lifetime of the clutch (an allowable use limit of a clutch).

SUMMARY OF THE INVENTION

In view of the above-stated conventional technologies' subjects and anticipated solutions thereof, the present disclosure aims at providing an alarm device for a wet clutch whereby the alarm device includes a means to establish a criteria as to the lifetime of the clutch (an allowable use limit of a clutch); based on the criteria, the lifetime of the clutch is estimated, and an alarm is issued prior to the clutch lifetime expiration so that the information regarding the lifetime expiration is informed of; further, the failure protection measures for the clutch are adopted.

In order to achieve the goals as mentioned, the present specification discloses
an alarm device for a wet clutch, whereby a counter clutch disc connected to an input shaft is connected to or disconnected from a clutch disc connected to an output shaft by charging or discharging hydraulic oil pressure into or out of the clutch, so that the input shaft is connected to or disconnected from the output shaft; wherein, the clutch comprises:
a slip heat release threshold setting means that establishes a threshold criteria as to the clutch damage or the clutch lifetime, in a form of the relation between the heat release generated in a clutch slip operation and the frequency of the heat release occurrences, whereby the heat release is measured per every predetermined time increment, and the number of the occurrences is counted through the predetermined clutch slip operation duration under a clutch operation mode condition till the clutch is damaged, the duration being changed and repeated so that the frequency as to every predetermined heat release interval to which the generated heat release belongs is counted;
a slip heat release calculating means that calculates the heat release during the clutch operation, based on the hydraulic oil pressure in the real clutch operation, as well as based on the relative circumferential speed between the disc and the counter disc;
an alarm device that raises an alarm based on the calculation result through the slip heat release calculating means, as well as based on the slip heat release threshold setting means.

A preferable embodiment according to the above main disclosure is the alarm device for a wet clutch, whereby the slip heat release calculating means performs the calculation as to the heat release during the clutch operation, only while the hydraulic oil pressure in the actual clutch operation is held within a predetermined alarm oil pressure range.

Another preferable embodiment according to the above main disclosure is the alarm device for a wet clutch, the device further comprising:
a heat release level estimating means (a heat release level decision means) that judges which heat release interval a generated (calculated) heat release calculated by the slip heat release calculating means belongs;
a slip heat release frequency counter (a slip heat release frequency counting means) that counts the number of occurrence per each of the heat release intervals, through a predetermined clutch operation hours (a predetermined hours as to a predetermined clutch operation mode); whereby an alarm signal is transmitted to the alarm device, based on a comparison of the actually counted number of occurrence per each of the heat release intervals with the frequency (the threshold number) of the heat release occurrences as to the corresponding interval the frequency which is established by the slip heat release threshold setting means.

Another preferable embodiment according to the above main disclosure is the alarm device for a wet clutch, the device further comprising:
a heat release level estimating means (a heat release level decision means) that judges which heat release interval a generated (calculated) heat release calculated by the slip heat release calculating means belongs;
a slip heat release frequency counter (a slip heat release frequency counting means that counts the number of occurrence per each of the heat release intervals, through a predetermined clutch operation hours (a predetermined hours as to a predetermined clutch operation mode); whereby the alarm device is provided with
a (clutch) lifetime estimation means that calculates and estimates the clutch lifetime in a case where the predetermined clutch operation hours (the predetermined hours as to a predetermined clutch operation mode) is continued, according to a comparison between
the counted number of occurrence per each of the heat release intervals the counted number which is counted by slip heat release frequency counter, and
the frequency of the heat release occurrences the frequency which is established by the slip heat release threshold setting means.

Another preferable embodiment according to the above main disclosure is the alarm device for a wet clutch, whereby the alarm device is provided with a clutch oil pressure regulator that regulates the hydraulic oil pressure so as to evade the clutch slip operation, in a case where an alarm is raised by the alarm device.

According to the above main disclosure, the clutch comprises: the slip heat release threshold setting means, the slip heat release calculator the alarm device;
whereby,
the slip heat release threshold setting means establishes a threshold criteria as to the clutch damage or the clutch lifetime, in a form of the relation between the heat release generated in a clutch slip operation (so called half-clutch operation) and the frequency of the heat release occurrences, thereby the heat release is measured per every predetermined time increment (interval), and the number of the occurrences is counted through the predetermined clutch slip operation duration under a clutch operation mode condition till the clutch is damaged, the duration being changed and repeated so that the frequency as to every predetermined heat release interval to which the generated heat release belongs is counted;

the slip heat release calculator calculates the heat release during the clutch operation, based on the hydraulic oil pressure in the actual clutch operation, as well as based on the relative circumferential speed between the disc and the counter disc;

the alarm device raises an alarm based on the calculation result through the slip heat release calculating means, as well as based on the slip heat release threshold setting means.

Thus, the heat release that directly effects on the clutch lifetime is calculated; based on the calculated heat release, the clutch damage prediction or the clutch (remaining) lifetime estimation is performed; accordingly, the wear status of the clutch can be recognized, and the safety operation of the clutch can be always achieved.

According to the present invention, even when the clutch device is not provided with a clutch disc temperature sensor, the clutch heat absorption (heat release) can be calculated based on the detected clutch oil pressure and the revolution speed difference between the input shaft and the output shaft. Thus, an expensive clutch disc temperature sensor can be dispensed with.

According to the before-described preferable embodiment of the present invention, the alarm device for a wet clutch is provided with the slip heat release calculating means that performs the calculation as to the heat release during the clutch operation, only while the hydraulic oil pressure in the actual clutch operation is held within a predetermined alarm oil pressure range. Thus, the calculation as to the heat release is not performed while the clutch is not being under a slip operation condition, namely, the clutch is being fully engaged or fully disengaged. Therefore, the slip heat release that has a basic effect on the clutch lifetime can be effectively calculated. As a result, the reliability regarding the clutch lifetime estimation can be enhanced.

According to the before-described preferable embodiment of the present invention, the alarm device for a wet clutch is provided with: the heat release level decision means; the heat release level estimating means; and, the slip heat release frequency counter; whereby an alarm signal is transmitted to the alarm device, based on a comparison of the actually counted number of occurrence per each of the heat release intervals with the frequency (the threshold number) of the heat release occurrences as to the corresponding interval frequency which is established by the slip heat release threshold setting means.

Thus, in a case where the actually counted number of occurrence get close to the threshold number, the clutch operator can be informed of the clutch part replacing time. Therefore, the operator can steadily operates the clutch till the clutch part replacing time is about to come.

According to the before-described preferable embodiment of the present invention, the alarm device for a wet clutch is provided with:

the heat release level estimating means that judges which heat release interval a generated heat release calculated by the slip heat release calculating means belongs;

the slip heat release frequency counter that counts the number of occurrence per each of the heat release intervals, through a predetermined clutch operation hours (a predetermined hours as to a predetermined clutch operation mode);

whereby the alarm device is further provided with the clutch lifetime estimation means that calculates and estimates the clutch lifetime in a case where the predetermined clutch operation hours (the predetermined hours as to a predetermined clutch operation mode) is continued, according to a comparison between the actually counted number of occurrence per each of the heat release intervals the counted number which is counted by slip heat release frequency counter, and the frequency of the heat release occurrences the frequency which is established by the slip heat release threshold setting means.

Thus, the clutch lifetime is estimated based on Miner's law (Q-N curve); accordingly, an alarm that includes not only damage information but also remaining lifetime information can be issued; in the case where a predetermined clutch operation mode of the predetermined hours is repeated, the lifetime can be informed of in a form of lifetime span of hours or days; the current wear status of the wet clutch can be recognized; in addition, the clutch operator can be informed of the clutch part replacing time.

According to the before-described preferable embodiment of the present invention, the alarm device for a wet clutch is provided with a clutch oil pressure regulator that regulates the hydraulic oil pressure so as to evade the clutch slip operation, in a case where an alarm is issued by the alarm device. Thus, according to the issued alarm, the clutch oil pressure can be automatically reduced, and the clutch slip operation can be forcefully terminated.

In addition, apart from the automatic termination, the operator can stop the clutch operation based on the issued alarm.

BRIEF DESCRIPTION OF THE DRAWINGS

The present invention will now be described in greater detail with reference to the preferred embodiments of the invention and the accompanying drawings, wherein.

DETAILED DESCRIPTION OF THE INVENTION

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
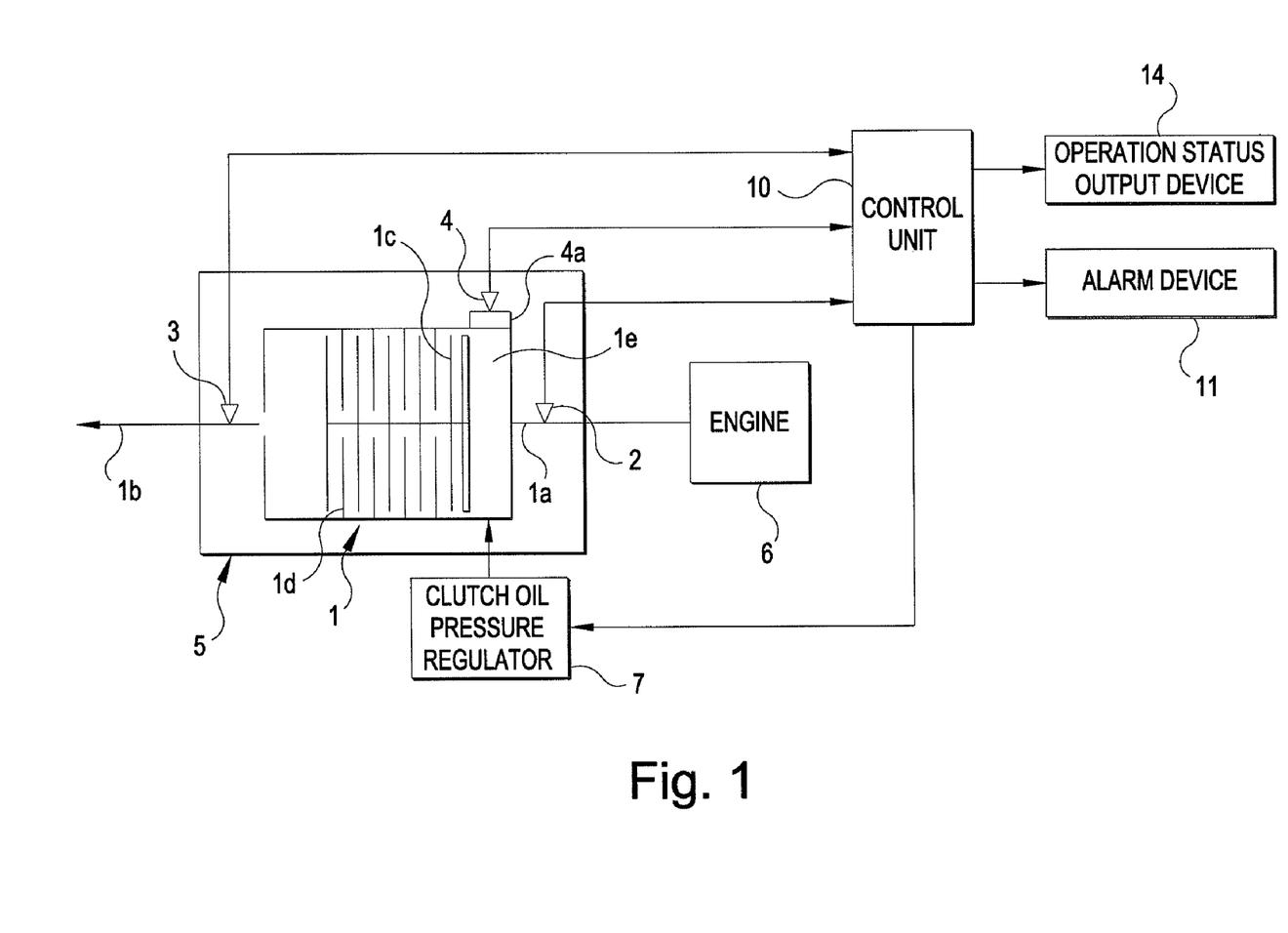
FIG. 1 shows a whole configuration of an alarm device for a wet clutch of a forklift, according to an embodiment of the present invention.
Figure 2:
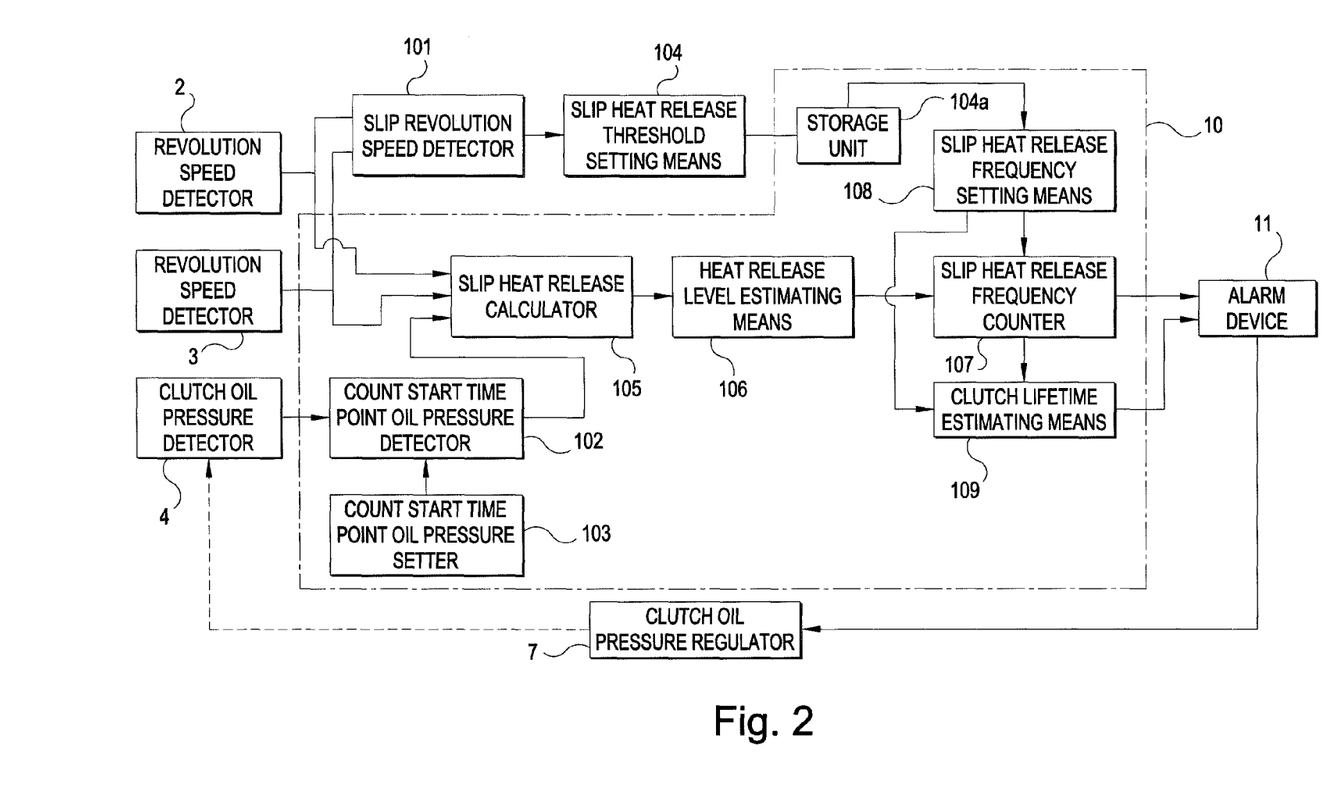
FIG. 2 shows a control flow diagram of the alarm device for the wet clutch, according to the embodiments.
Figure 3:
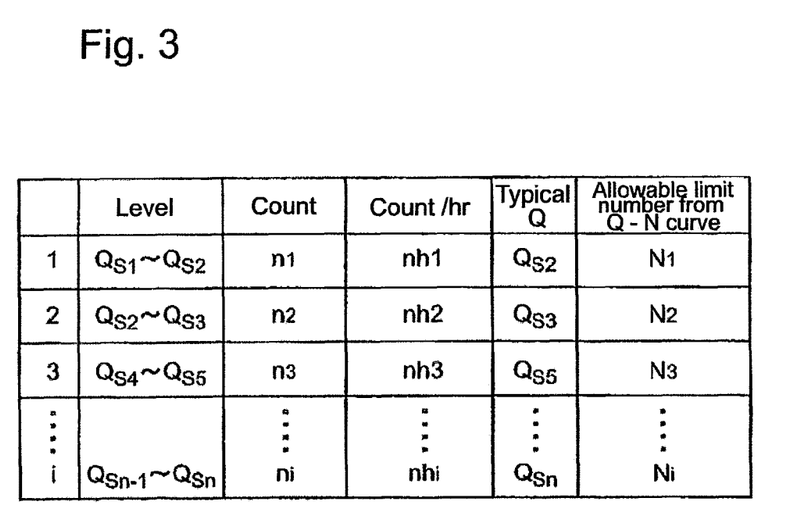
FIG. 3 shows a table regarding frequency distribution as to the alarm device.
Figure 4:
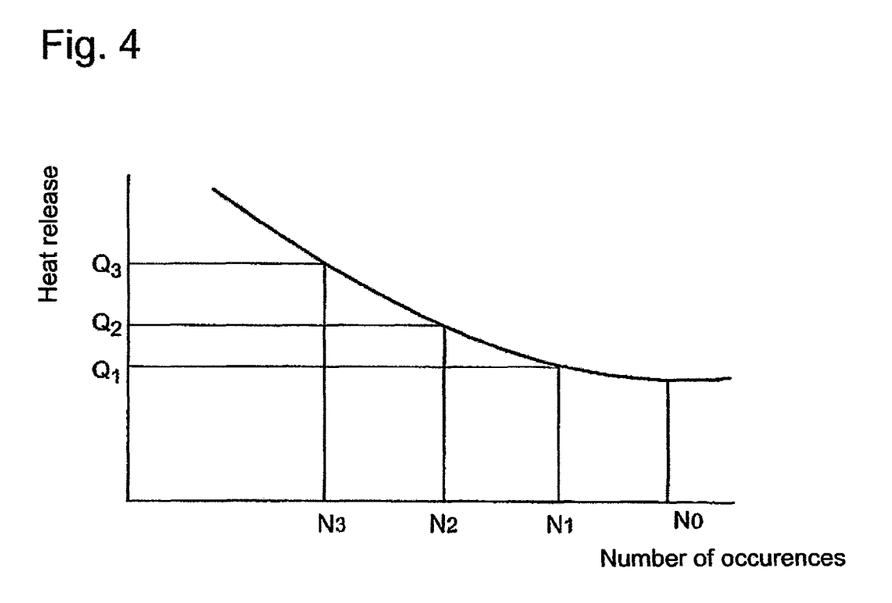
FIG. 4 shows a characteristic curve as to the damage index (generated heat) in relation to the number of the clutch slip operation repetition.
Figure 5:
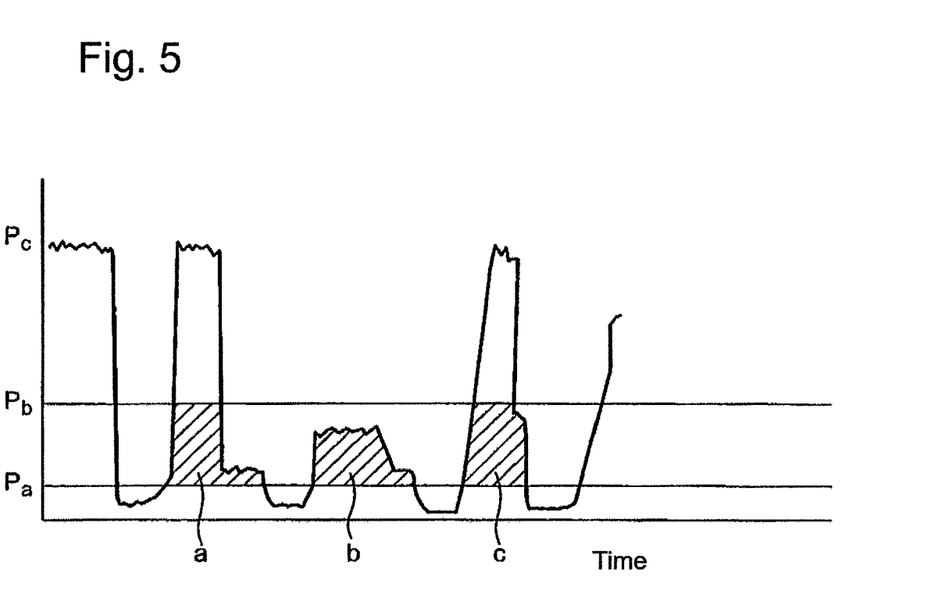
FIG. 5 shows a progression of the clutch oil pressure over a span of time.

FIG. 1 shows a whole configuration of an alarm device for a wet clutch of a forklift, according to an embodiment of the present invention; FIG. 2 shows a control flow diagram of the alarm device for the wet clutch, according to the embodiment; FIG. 3 shows a table regarding frequency distribution as to the alarm device; FIG. 4 shows a characteristic curve as to the damage index (generated heat) in relation to the number of the clutch slip operation repetition; FIG. 5 shows a progression of the clutch oil pressure over a span of time.

In FIG. 1, reference numeral 6 denotes an engine; reference numeral 5 denotes a transmission; reference numeral 1 denotes a wet clutch that is provided in a transmission 5, whereby the engine 6 is connected to or disconnected from an output side of the forklift. A torque converter or a train of gears may be provided between the engine 6 and the wet clutch 1.

In the clutch 1, a counter clutch disc 1d connected to an input shaft 1a is connected to or disconnected from a clutch disc 1c connected to an output shaft 1b by charging or discharging hydraulic oil (fluid) pressure into or out of a clutch oil chamber 1e. This type of wet clutch configuration is already well known.

Reference numeral 2 denotes a revolution speed detector for the input shaft 1a; reference numeral 3 denotes a revolution speed detector for the output shaft 1b; reference numeral 4 denotes a clutch oil pressure detector that detects the hydraulic oil (fluid) pressure at the oil inlet side of a control valve 4a through which the hydraulic oil flows into the clutch oil chamber 1e. The detected signals from the revolution speed detector 2 as to the revolution speed of the input shaft 1a, from the revolution speed detector 3 as to the revolution speed of the output shaft 1b, and from the clutch oil pressure detector 4 as to the hydraulic oil pressure working on the surfaces of the clutch discs and the counter clutch discs 1d are input into a control unit 10.

The control unit 10 performs arithmetic computations according to the detected signals from the above-described detectors; the results of the computations are transferred to an alarm device 11 and an operation status output device 14. Reference numeral 7 denotes a clutch oil pressure regulator that controls the clutch oil pressure.

In consultation with FIG. 2, and in response to the embodiment thereof, the control method of the alarm device for the wet clutch is now explained.

At first, a case is taken into account wherein the clutch 1 is under an inching condition; hereby, the inching condition means a case where the input shaft 1a and the output shaft 1b are not completely connected to or disconnected from each other, and the surfaces of the clutch discs (on the input shaft side) are forced to slip on the surfaces of the counter discs (on the output shaft side); namely, under the inching condition, the hydraulic oil pressure is kept at a certain level so that the clutch discs and the counter discs slip mutually.

The heat quantity per unit time span per unit area generated in the clutch during the inching operation is calculated by use of the following formula (1):

$$q_i = \mu P_i V_i = \mu P_i (2\pi R/60) \Delta N_i, \quad (1)$$

where, $P_i$ is the clutch contact pressure (the contact pressure between the above-described two types of discs);

R is a typical mean radius at which the above-described two types of discs slip mutually, and the thrusting force is transferred each other through the virtual circle of the radius R;

$V_i$ is a relative circumferential speed between the two types of discs in regard to the radius R;

$\mu$ is a friction factor between the two types of discs;

$\Delta N_i$ is a revolution speed difference (a slip revolution difference) between the input shaft and the output shaft;

in addition, the clutch contact pressure $P_i$ is the disc contact surface pressure when the hydraulic oil pressure Pc is $Pc_i$.

Further, it is hereby noted that the heat quantity (heat release) $q_i$ in the formula (1) has a dimension of [ENERGY]/[AREA]·[TIME]; namely, $q_i$ is an energy (heat) quantity per unit time span per unit area; and, an energy (heat) quantity per unit time span is often regarded as a heat release rate or a heat absorption rate. In other words, $q_i$ is a heat release rate (a heat absorption rate) per unit area as to the clutch discs. In this specification, as a rule, the heat quantity (heat release) or the heat quantity rate (heat release rate) relates to the unit area.

The alarm device for a wet clutch according to the present invention is provided with a slip revolution speed detector (calculator) 101 into which a revolution speed $N_{1i}$ of the input shaft 2 and a revolution speed $N_{2i}$ of the output shaft 3 are inputted so as to calculate a slip revolution speed $\Delta N_i$ by the following equation (2):

$$\Delta N_i = N_{1i} - N_{2i}, \quad (2)$$

where, the subscript i corresponds to the index i of the hydraulic oil pressure $Pc_i$.

The heat quantity (heat release) Qi generated in the clutch under the inching condition are calculated by the following equation:

$$Qi = \int_0^{Ti} q_i dT,$$

where, Ti corresponds to the continuous inching time duration in which the inching condition lasts; in response to i=1, 2 or n, the heat quantity (heat release) Q1, Q2, or Qn is generated in the time duration T1, T2, or Tn respectively; then, the following equations hold.

$$Q1 = \int_0^{T1} q_i dT \quad (3)$$

$$Q2 = \int_0^{T2} q_i dT \quad (4)$$

$$Qn = \int_0^{Tn} q_i dT \quad (5)$$

Thus, through the above equations (2) to (5), the heat release amounts Q1, Q2, . . . , Qi are obtained in the slip heat release threshold setting means 104 (a slip heat release threshold calculator 104), by use of the parameters such as the slip revolution speed difference $\Delta N_i$ that is the difference between the input revolution speed $N_{1i}$ of the input shaft 2 and the revolution speed $N_{2i}$ of the output shaft 3, and a plurality of continuous inching time spans T1, T2, . . . , Ti; hereby, the term "continuous inching time span" means the slip operation time span as to the clutch disc slip conditions. In a case where the inching time spans (duration) T1, T2, . . . , Ti are substantially not equal among others, the heat release amounts Q1, Q2, . . . , Qi may be considered or compared, after these amounts are converted into the amounts per unit time. In other words, when the inching time spans T1, T2, . . . , Ti deviate from a standard time span T, then the heat release amounts Q1×T1/T, Q2×T2/T, . . . , Q1×T1/T may be taken into consideration, instead of the heat release amounts Q1, Q2, . . . , Qi.

The continuous inching operation, namely, the clutch slip operation of a predetermined time span is repeated; thus, the number N1, N2, . . . , Ni as to the allowable repetition times with which the clutch is damaged is counted.

In the practical counting, the repetition number is computed per every predetermined time span of every second-order interval within the continuous inching operation.

At a transmission test bench, the repetition number N (in relation to the heat release Q) with which the clutch discs are damaged is experimentally obtained with respect to the heat release (heat quantity) Q as a parameter; a characteristic relation (which is called a Q-N curve) as depicted in FIG. 4 is obtained; and, the Q-N curve is memorized in a storage unit 104a with a table format in a slip heat release threshold setting means 104 (a slip heat release threshold calculator 104); in other words, the Q-N curve is formed in the slip heat release threshold calculator 104.

Following the above, in a slip heat release calculator 105 (a slip heat release calculating means 105), the heat quantity (heat release) that is an attrition index regarding the wet clutch 1 is calculated in actual operation apart from the test bench operation.

To be more precise, the detected clutch oil pressure Pc detected by the clutch oil pressure detector 4 is inputted into a count start time point oil pressure detector 102, to which a count start time point oil pressure setter 103 is connected, in which the actually generated heat quantity (heat release) Qs corresponding to the every predetermined time increment (in every second-order interval) is calculated when the detected clutch oil pressure Pc falls within a range from Pa to Pb as depicted in FIG. 5; namely, the count start time point oil pressure detector 102 starts calculating the heat quantity (heat release) Qs in a case where the time dependent oil pressure (transition) is maintained within the pressure range from Pa to Pb, as the transition type b in FIG. 5 shows. In a case where the oil pressure transition type is a or c in FIG. 5, namely, in a case where the maintained oil pressure is out of the range between the thresholds Pa and Pb, the repetition (cumulative) counting is not performed.

In relation to each time increment (with the index "i"), the actually generated heat quantity (heat release) $Qs_i$ is calculated by the following equation:

$$Qs_i = \int_0^T \mu P_i V_i dT \tag{9}$$

where, $\mu$ is a friction factor;

$P_i$ is the clutch contact pressure at a time point T;

$V_i$ is a relative circumferential speed at a time point T.

In the next place, in a heat release level estimating means 106 (namely, a heat release level decision means 106), it is estimated which heat quantity level range (a plurality of intervals as to the heat release) each calculated $Qs_i$ is classified into or belongs to. Hereby, a heat quantity range may be regarded as an interval such as $[Qs_n, Qs_{n+1}]$ (n=1, 2, . . . ).

In a predetermined clutch operation hours (for example, a certain operating hours during a day from the operation start to the operation stop), when the actually detected clutch oil pressure Pc detected by the clutch oil pressure detector 4 comes into the clutch oil pressure alarm range [Pa, Pb] that corresponds to the pressure transition type b in FIG. 5, each $Qs_i$ is calculated and classified into an interval such as $[Qs_n, Qs_{n+1}]$ (n=1, 2, . . . ), by means of the heat release level estimating means 106 (or the heat release level decision means 106).

In a case where the detected pressure transition level is out of the clutch oil pressure range [Pa, Pb] for a certain period of time as is the case the oil pressure transition types a and c in FIG. 5, the detected results (data) are not used for the judgment as to the alarm issue or the lifetime estimation, since the clutch is not under a slip condition.

A slip heat release frequency counter 107 (namely, a slip heat release frequency counting means 107), counts how many times the calculated $Qs_i$ has appeared so as to belong to each heat release range $[Qs_i, Qs_{i+1}]$ (i=1, 2, . . . ), namely, the counting means 107 counts the actually appeared frequency $n_i$ of the calculated $Qs_i$ in each heat release interval $[Qs_n, Qs_{n+1}]$ (n=1, 2, . . . ), whereby $Qs_n \leq Qs_i \leq Qs_{n+1}$. This frequency counting is performed for a predetermined clutch operation hours (for example, the certain operating hours during a day from the operation start to the operation stop). Each actually appeared frequency (the number of counts) $n_i$ is memorized on a map in the control unit 10; thereby, each number $n_i$ of counts in response to each heat release interval $[Qs_n, Qs_{n+1}]$ is converted into a number of counts per hour (namely, $n_i$ is converted into $n_{hi}$ that is also memorized).

Following the above, a slip heat release frequency setting means 108 reads an allowable limit number Ni of repetition for each heat release interval $[Qs_n, Qs_{n+1}]$ from the Q-N curve that is formed in the slip heat release threshold calculator 104, and saves the number Ni as datum (see FIG. 3); thereby, in determining the number Ni from the Q-N curve, a typical value in the interval $[Qs_n, Qs_{n+1}]$ is adopted (for example, the maximum value $Qs_{n+1}$ is adopted).

Further, after a predetermined clutch operation hours (for example, the certain operating hours during a day from the operation start to the operation stop) has passed, a clutch lifetime estimation means 109 estimates the clutch life (lifetime) $L_H$ by use of Miner's law, namely, the following equation (10), under the premise that the clutch operating mode (pattern) during a day from the operation start to the operation stop will be repeated.

$$L_H = \frac{1}{\sum_{i=1}^{m} \frac{n_{hi}}{N_i}} \text{ (hours)} \tag{10}$$

In the above equation, $n_{hi}$ is the number of counts per hour calculated and memorized by the slip heat release frequency counter 107, while Ni is the allowable limit number of repetition for each heat release interval calculated and memorized by the slip heat release frequency setting means 108.

In the above lifetime calculation, even if the clutch operation mode varies or operation hours per day is changed, the calculation method can be effective in estimating the lifetime of the clutch under the premise that the mode and the cycle thereof are repeated. Thus, the remaining lifetime hours (or days) can be estimated.

According to the present invention, even when the clutch device is not provided with a clutch disc temperature sensor, the clutch heat absorption (heat release) Qi can be calculated based on the detected clutch oil pressure Pc and the revolution speed difference $\Delta N_i$ between the input shaft and the output shaft. Thus, an expensive clutch disc temperature sensor is not necessary.

By outputting the calculated lifetime into the alarm device 11, the clutch operator can be informed of the clutch lifetime on the basis of the premise that the clutch operation mode and the operation cycle thereof are repeated; thus, the operator can recognize the current wear status of the wet clutch, and learn about when the clutch parts need replacing.

According to the present invention, in addition to the manner where the clutch lifetime is estimated through Miner's law, or apart from the lifetime prediction manner, there may be another manner in which an alarm signal is transmitted into the alarm device 11 when the repetition number $n_i$ that appeared actually in each heat release interval exceeds the allowable maximum repetition number Ni in relation to the heat release interval.

Specifically in the very above manner, an allowable repetition number Ni (the established threshold number Ni as to the heat release) is replaced with a new number Ni' that is smaller than Ni; and, just before the counted number $n_i$ gets close to Ni', the clutch part replacing timing is notified to the operator by the alarm device 11. Thus, an alarm with a safety margin as to the clutch damage can be issued.

According to the present invention, there may be another manner in which an alarm is issued to the operator by the alarm device 11, in addition to number counting as to $n_i$ in relation to Ni, when a calculated heat release during the clutch operation in the clutch oil pressure alarm range [Pa, Pb] exceeds an allowable maximum heat release Qmax that is set as a maximum threshold.

Based on the very above manner, the alarm device 11 notifies the operator of the clutch part replacing timing when the counted number $n_t$ approaches the threshold number Ni, and the clutch oil pressure alarm range [Pa, Pb] exceeds the allowable maximum heat release Qmax. Thus, the operator can continues the operation of the clutch with a feeling of security, till the clutch part replacing time is about to come.

According to the present invention, there may be another manner; whereby in response to an alarm signal that the alarm device 11 issues, the alarm signal is transmitted to the clutch oil pressure regulator 7; then, the clutch oil pressure regulator 7 automatically reduces the clutch oil pressure in the clutch oil chamber 1e so as to evade the inching operation (the clutch slip operation) of the wet clutch 1; and, the slip operation of the wet clutch 1 is forcefully terminated. Thus, the wet clutch 1 can be prevented from damage.

Further, after the control unit 10 transmits an alarm signal to the alarm device 11, the alarm signal is transmitted to an operation status output device 14 that reserves the alarm signal as an clutch operation record According to the present invention, a guideline as to the alarm is established based on the total heat release with which the clutch is damaged; in accordance with the guideline, the estimation and alarm as to the lifetime of clutch is issued. Therefore, the current status as to the clutch wear or the degree of damage can surely be kept track of. As a result, the reliability of the issued alarm can be enhanced.

INDUSTRIAL APPLICABILITY

The present invention provides an alarm device for a wet clutch whereby the alarm device includes a means to establish a criteria as to the lifetime of the clutch (an allowable use limit of a clutch); based on the criteria, the lifetime of the clutch is estimated, and an alarm is issued prior to the clutch lifetime expiration so that the information regarding the lifetime expiration is informed of; further, the failure protection measures for the clutch are adopted.

The invention claimed is:

1. An alarm device for a wet clutch, whereby a counter clutch disc connected to an input shaft is connected to or disconnected from a clutch disc connected to an output shaft by charging or discharging hydraulic oil pressure into or out of the clutch, so that the input shaft is connected to or disconnected from the output shaft; wherein, the clutch comprises:
   a storage unit that stores data as to a relationship between a heat release generated in a clutch slip operation for a predetermined time and a repetition number with which the clutch is damaged, the relationship being established by measuring respective repetition numbers while changing the predetermined time in the clutch slip operation under an inching condition of the clutch;
   a slip heat release calculating means that calculates an actual heat release during an actual clutch slip operation, based on an actual hydraulic oil pressure during the actual clutch slip operation and an actual relative circumferential speed between the disc and the counter disc;
   an alarm device that raises an alarm based on the calculation result through the slip heat release calculating means and on the relationship between the heat release and the repetition number stored by the storage unit.

2. The alarm device for a wet clutch according to claim 1, whereby the slip heat release calculating means that calculates the heat release during the clutch operation, only while the hydraulic oil pressure in the actual clutch operation is held within a predetermined alarm oil pressure range.

3. The alarm device for a wet clutch according to claim 1, the device further comprising:
   a heat release level estimating means that judges which heat release interval a generated heat release calculated by the slip heat release calculating means belongs;
   a slip heat release frequency counter that counts the number of occurrences per each of the heat release intervals, through a predetermined clutch operation hours; whereby an alarm signal is transmitted to the alarm device, based on a comparison of the actually counted number of occurrences per each of the heat release intervals with the relationship between the heat release and the repetition number stored by the storage unit.

4. The alarm device for a wet clutch according to claim 1, the device further comprising:
   a heat release level estimating means that judges which heat release interval a generated heat release calculated by the slip heat release calculating means belongs to;
   a slip heat release frequency counter that counts a number of occurrence per each of the heat release intervals, through a predetermined clutch operation hours; whereby the alarm device is provided with
   a clutch lifetime estimation means that calculates and estimates the clutch lifetime in a case where the predetermined clutch operation hours is continued, according to a comparison between
   the counted number of occurrences per each of the heat release intervals the counted number which is counted by slip heat release frequency counter, and the relationship between the heat release and the repetition number stored by the storage unit.

5. The alarm device for a wet clutch according to claim 1, whereby the alarm device is provided with a clutch oil pressure regulator that regulates the hydraulic oil pressure so as to evade the clutch slip operation, in a case where an alarm is raised by the alarm device.

\* \* \* \* \*